Oct. 31, 1967

M. COWELL 3,349,730

PLANTER

Filed March 24, 1965

Murl Cowell
INVENTOR.

Oct. 31, 1967        M. COWELL        3,349,730
PLANTER
Filed March 24, 1965        3 Sheets-Sheet 2
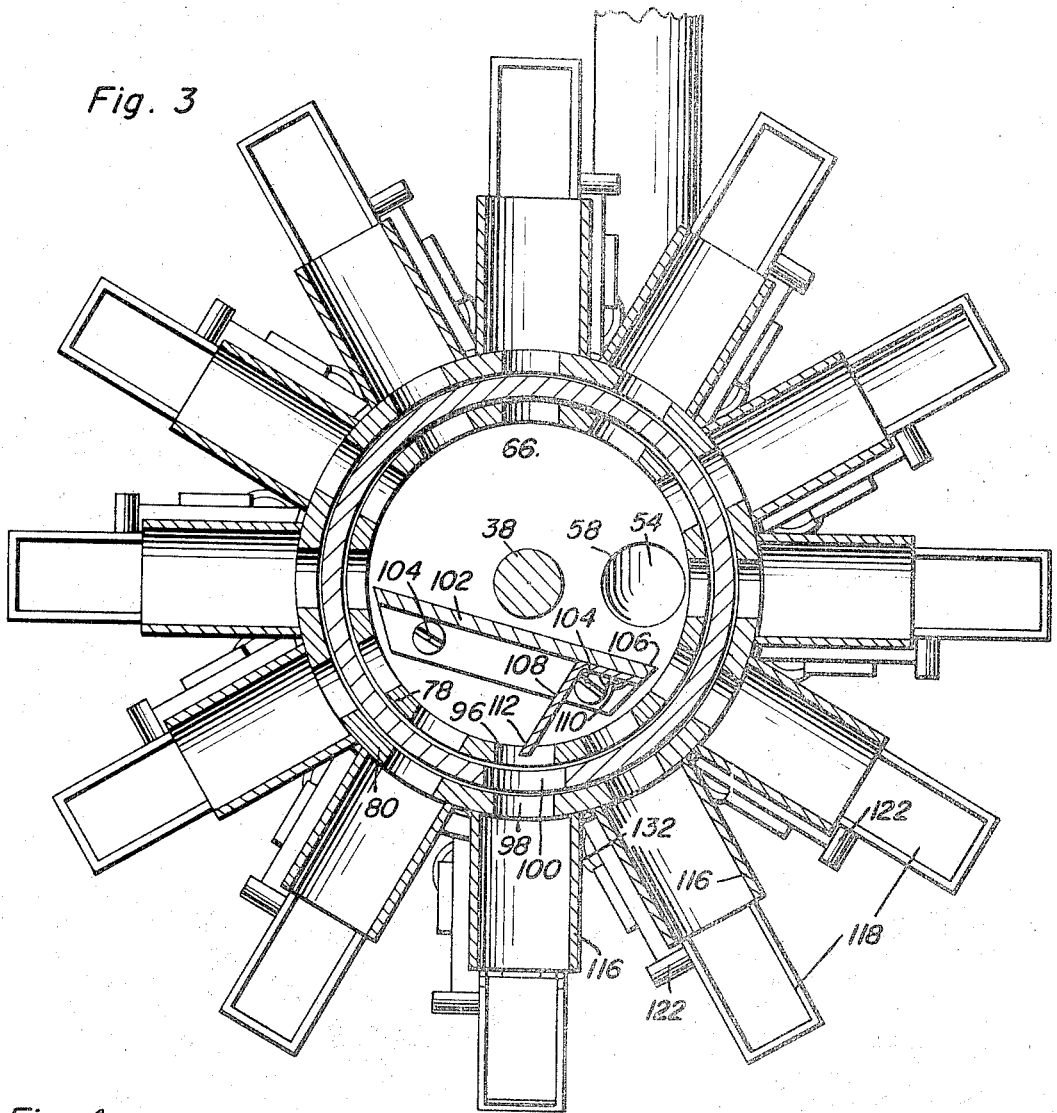
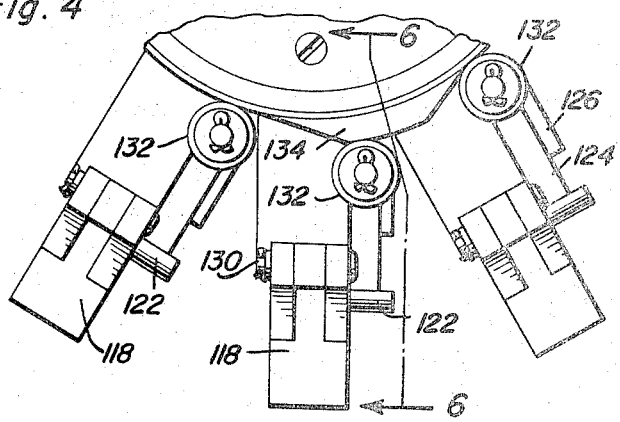
Murl Cowell
INVENTOR.

Fig. 5
Fig. 6
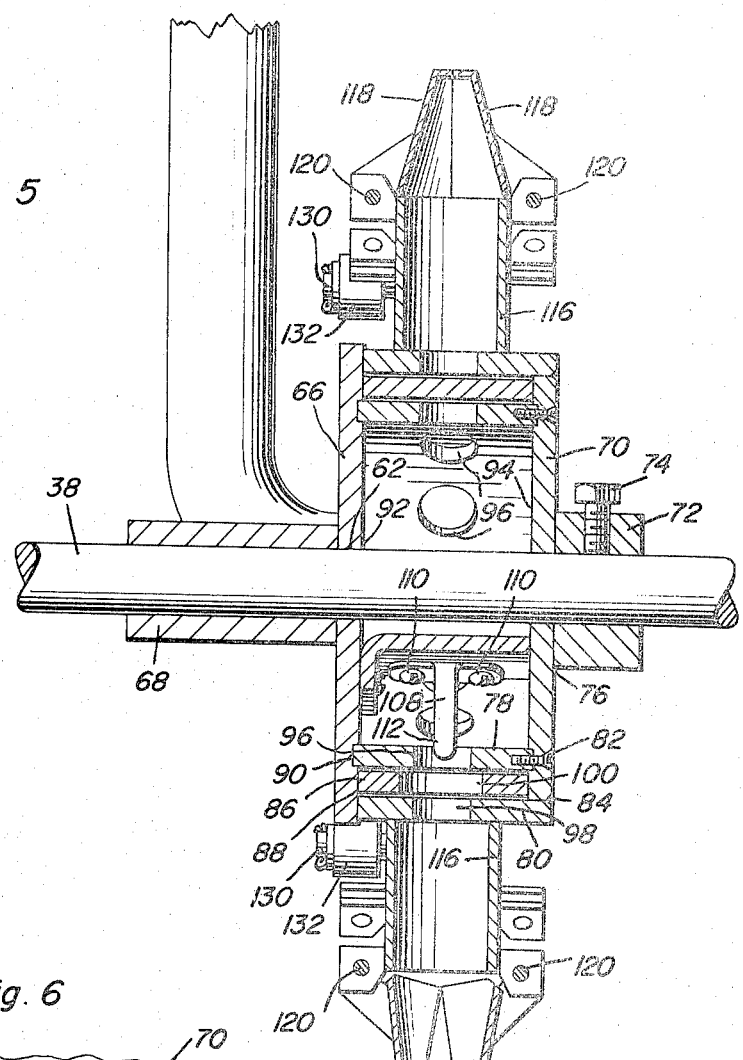
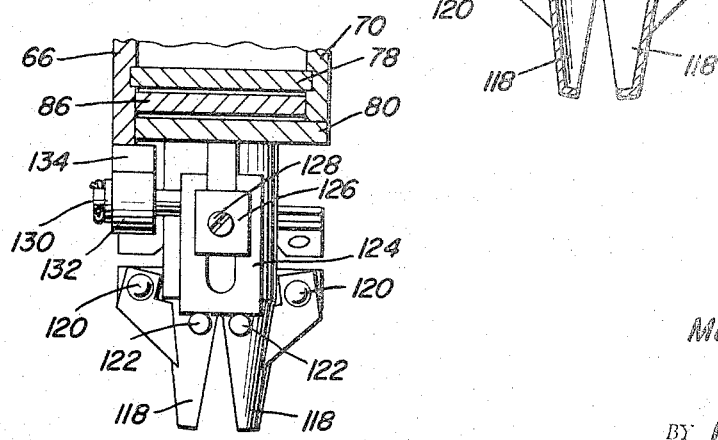
Murl Cowell
INVENTOR.

United States Patent Office 3,349,730
Patented Oct. 31, 1967

3,349,730
PLANTER
Murl Cowell, Durant, Okla., assignor, by direct and mesne assignments, of twenty-five percent to A. H. Lindell and ten percent to Harry Brown, both of Oklahoma City, Okla.
Filed Mar. 24, 1965, Ser. No. 442,353
1 Claim. (Cl. 111—91)

ABSTRACT OF THE DISCLOSURE

A hollow planter housing adapted to be drivingly rotated about a horizontal axis and including outer cylindrical wall portions generally coaxial with the center of the housing, the outer wall portions of the housing including generally radially outwardly projecting tubular seed receiving and planting assemblies communicated with the interior of the housing at their inner ends and carrying a clam shell type outwardly tapering and wedge shaped ground penetrating implement at their outer ends, means being provided for singly discharging seed from within the housing into the tubular seed receiving assemblies and for automatically opening the outwardly tapering clam shell type ground penetrating implements as they are swung to positions at least closely adjacent their lowermost positions relative to the center axis of the housing.

---

This invention relates to a novel and useful planter and more specifically to a planter of the tool bar supported type and including a hopper of ample size for storing large quantities of seed and also means for conveying the seed from the hopper to the planter.

The planter of the instant invention includes a drum-like structure having one stationary end wall through which a seed supply pipe opens, the remote end of the seed supply pipe being communicated with the interior of the associated seed hopper whereby constant supply of seed may be provided for the drum-like hopper or body portion. The stationary end wall of the body rotatably receives through the center thereof a drive shaft on which the remote end wall for the body is mounted for rotation therewith. The remote end wall of the body includes first and second inner and outer cylindrical wall portions which are concentrically disposed about the aforementioned shaft and which are secured to the remote end wall and project toward the stationary end wall with their ends adjacent the stationary end wall disposed in closely spaced relation with said stationary end wall.

In addition to the first and second cylindrical wall portions supported from the revolving end wall of the drum-like hopper, the stationary end wall also includes a third or intermediate cylindrical wall portion which is secured thereto in concentric relation about the drive shaft and projects toward the remote end wall and likewise terminates in closely spaced relation relative thereto, the intermediate cylindrical wall portion being disposed between the inner and outer cylindrical wall portions supported from the remote end wall. Accordingly, the intermediate cylindrical wall portion is mounted in a stationary manner from the stationary end wall and the inner and outer cylindrical wall portions are supported for rotation relative to the intermediate cylindrical wall portion.

The inner and outer cylindrical wall portions are provided with radially aligned and circumferentially spaced seed dispensing openings and the outer cylindrical wall portion has a plurality of seed dispensers secured thereto about the openings formed therein and operable upon rotation of said drum-like hopper to consecutively dig into the ground and plant a seed as each seed dispenser is swung into a preselected rotated position about said stationary end wall.

The planter of the instant invention is of the type adapted to be supported from a tool bar and to be driven from suitable ground engaging wheels at the proper speed relative to a forward movement of the supporting tool bar in order that the peripheral speed of the seed dispensers of the planter will be substantially equal to the forward linear speed of the tool bar from which the planter is supported.

The main object of this invention is to provide a seed planter adapted to roll along the ground which is to be planted and including means for automatically penetrating the ground, dispensing seed into the recess made by the penetration of the planter in the ground and then allowing the ground to be closed over the dispensed seed.

Another object of this invention is to provide a planter constructed in a manner enabling it to be readily utilized for mounting on substantially all conventional tool bars and utilized to plant numerous types of seeds, the planter being adaptable to efficiently dispense and plant numerous types of seeds.

Yet another object of this invention is to provide a seed planter that will readily adapt itself for support from substantially all tool bars.

A final object of this invention to be specifically enumerated herein is to provide a seed planter in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings, forming a part hereof, wherein like numerals refer to like parts throughout, and in which:

FIGURE 3 is a fragmentary enlarged vertical sectional view taken substantially upon the plane indicated by the section line 3—3 of FIGURE 1;

FIGURE 4 is a fragmentary view of the lower part of the assembly illustrated in FIGURE 3 of the drawings and as seen from the back side thereof;

FIGURE 5 is a fragmentary enlarged vertical sectional view taken substantially upon the plane indicated by the section line 5—5 of FIGURE 2; and FIGURE 6 is a fragmentary vertical sectional view taken substantially upon the section line 6—6 of FIGURE 4.

Figure 1:
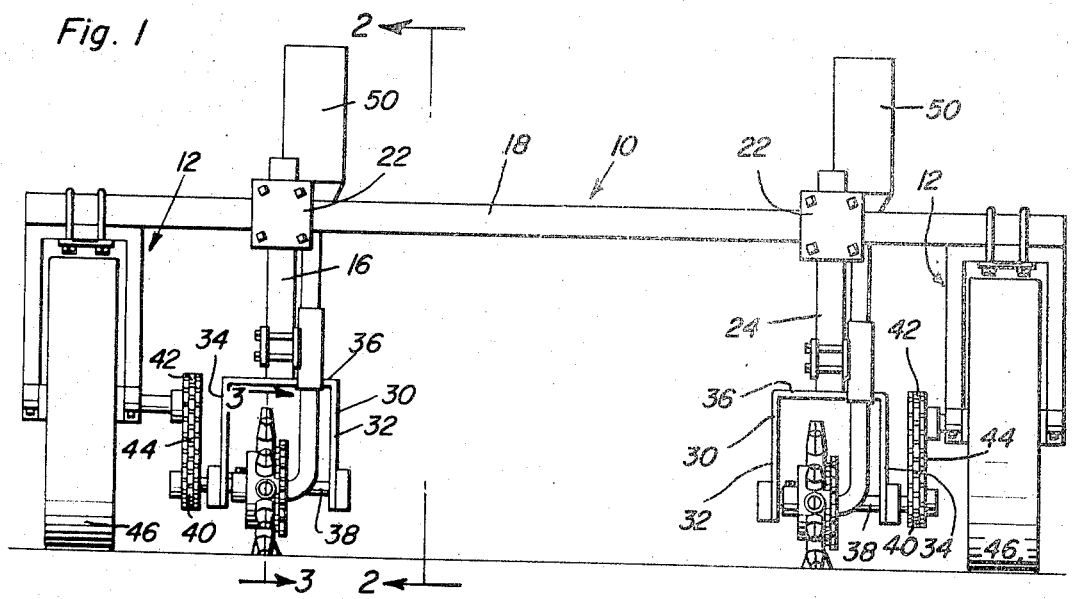
FIGURE 1 is a front elevational view of a wheel supported tool bar assembly shown with a pair of the seed planters of the instant invention operatively supported therefrom.
Figure 2:
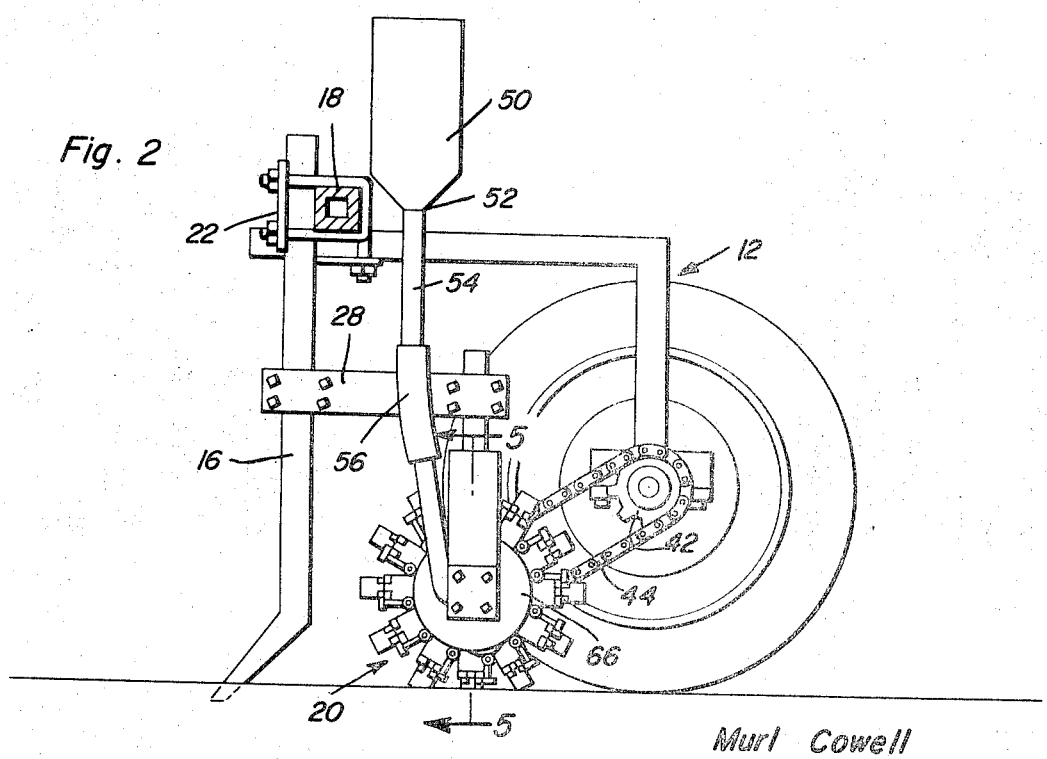
FIGURE 2 is an enlarged vertical sectional view taken substantially upon the plane indicated by the section line 2—2 of FIGURE 1.

Referring now more specifically to the drawings, the numeral 10 generally designates a tool bar assembly including a pair of ground engaging support wheels generally referred to by the reference numeral 12 and adapted to be supported from and/or pulled by a suitable draft implement.

The tool bar assembly 10 has a pair of trenching shanks 16 dependingly supported from the horizontal cross bar 18 thereof and one of the planter assemblies of the instant invention generally designated by the reference numeral 20 is operatively associated with each of the trenching shanks 16 and disposed therebehind.

Each of the trenching shanks 16 is secured to the horizontal member 18 by means of a suitable clamping assembly 22 and each of the planter assemblies 20 includes a depending shank portion 24 whose upper end is clampingly supported from the corresponding trenching shank 16 by means of a clamp assembly 28.

The shank portion 24 includes a downwardly opening and bifurcated mount 30 on its lower end including a pair of depending legs 32 and 34 interconnected at their upper ends by means of a bight portion 36 supported from the lower end of the corresponding shank portion 24. A drive shaft 38 is rotatably journalled from the lower ends of the depending legs 32 and 34 and has a drive sprocket 40 mounted thereon which is aligned with a sprocket 42 driven by the corresponding ground engaging support wheel 12, an elongated flexible drive member 44 being entrained over each pair of aligned pulleys 40 and 42 in order to effect rotation of the drive shaft 38 in response to rotation of the wheels 46 of the ground engaging support wheel assemblies 12.

Each of the planter assemblies 20 includes a seed hopper 50 with an outlet 52 in its lower end opening into the upper end of a seed conduit 54 supported from the clamp assembly 28 in any convenient manner such as by a support sleeve 56. The lower end of the seed conduit 54 opens through an opening 58 formed in a stationary end wall 66 which is centrally apertured as at 62 and rotatably receives the drive shaft 38 therethrough. In addition, the end wall 66 includes a sleeve bearing member 68 which is fixed relative thereto and which also rotatably journals the drive shaft 38 and may be attached to and thereby provide support for the lower end of the seed conduit 54.

The drive shaft 38 has a rotatable end wall 70 mounted thereon by means of a collar 72 and its setscrew 74, the collar 72 being fixed relative to the rotatable end wall 70 by means of welding 76, and the rotatable end wall 70 includes first and second inner and outer cylindrical wall portions 78 and 80, the former being secured to the end wall 70 by means of screws 82 and the latter being secured to the end wall assembly by means of welding 84. The cylindrical wall portions 78 and 80 are concentrically disposed relative to each other and the drive shaft 38 and it may be seen that the stationary end wall 66 includes a stationary intermediate cylindrical wall portion 86 which is secured thereto in any convenient manner such as by welding 88 and which is disposed between the inner and outer cylindrical wall portions 78 and 80.

The free end portions of the inner and outer cylindrical wall portions 78 and 80 are disposed in closely spaced relation relative to the stationary end wall 66 and it may be seen that the free end of the inner cylindrical wall portion 78 is actually snugly received within a circular groove 90 formed in the inner face 92 of the stationary end wall 66. The intermediate cylindrical wall portion 86 has its free end edge disposed closely adjacent the inner surface 94 of the rotatable end wall 70 and from FIGURE 3 of the drawings it may be seen that the inner and outer cylindrical wall portions 78 and 80 are provided with circumferentially spaced and radially aligned seed discharge openings 96 and 98. Further, the intermediate cylindrical wall portion 86 includes a single opening 100 with which the various pairs of radially aligned openings 96 and 98 of the inner and outer cylindrical wall portions 78 and 80 are intermittently registrable during rotation of the inner and outer cylindrical wall portions 78 and 80.

The stationary end wall 66 has an L-shaped supporting angle bracket 102 mounted thereon by means of screw fasteners 104 and includes a mounting flange portion 106 on which a resilient spring finger 108 is mounted by means of fasteners 110. The spring finger 108 remains stationary during rotation of the inner and outer cylindrical wall portions 78 and 80 as it is supported from the stationary end wall 66. Its free end portion 112 therefore drops into each of the openings 96 and assures that any seeds disposed within the opening 96 are ejected through the opening 100 and thereafter outwardly of the corresponding opening 98.

The outer cylindrical wall portion 80 has a plurality of seed receiving spouts 116 secured thereto in registry with the openings 98. The outer end of each of the seed receiving spouts 106 includes a pair of pivoted seed dropper jaws 118 which are pivotally supported from the spouts 116 by means of pivot pins 120. Each pair of seed dropper jaws includes a pair of actuating pins 122 which project laterally outwardly therefrom and which are engageable by a slide 124 which is mounted on the corresponding spout 116 by means of a slide cap 126 held in position on the corresponding spout 116 by means of a suitable fastener 128. Each of the slides 124 includes a laterally directed pin 130 on which a roller 132 is journalled.

The rollers 132 of the various slides 124 are successively engageable with a cam segment 134 supported from the lower peripheral portion of the stationary end wall 66. Accordingly, as the drum-like hopper defined by the end walls 66 and 70 and the cylindrical wall portions 78, 80 and 86 has its inner and outer cylindrical wall portions rotated upon the drive shaft 38 being driven by the corresponding sprocket 42, successive pairs of openings 96 and 98 are moved into registry with the opening 100 formed in the intermediate cylindrical wall portion 86. The spring finger 108, by means of its free end portion 112, then assures that seed within the opening 96 is forced therefrom through the opening 100 and the corresponding opening 98 and into the seed receiving spout 116. Of course, the depositing of the seed from the hopper and into the lowermost spout 96 takes place almost simultaneously with the corresponding roller 132 causing the seed dropper members to be pivoted toward their open positions illustrated in FIGURES 5 and 6 of the drawings after having been placed in the trough formed by the preceding trenching shank 16.

Any suitable means may be provided for yieldingly urging the seed dropper arms toward the closed positions and it may therefore be seen that the applicant has provided an extremely simple device which operates in a desirable manner and which is expected to have a long life of operation due to its relative simplicity.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A planter assembly comprising a generally horizontal shaft adapted to be journaled from a tool bar and driven at a given rate relative to the speed of movement of said tool bar over ground to be planted, a seed receiving and dispensing housing, said housing including a first end wall journaled on said shaft and an outer generally cylindrical wall portion rotatable with said shaft and including a plurality of generally radially outwardly projecting tubular seed receiving and planting assemblies communicated with the interior of said housing at their inner ends, an upstanding gravity feed seed conduit, the lower end of said seed conduit opening through said end wall and adapted at its upper end to be communicated with the outlet opening of a seed hopper, said housing including means operative to meter seed therein into the radial innermost ends of said tubular seed receiving and planting assemblies at predetermined angularly rotated positions of said assemblies about the axis of rotation of said shaft, the outer end portions of said seed receiving and planting assemblies each including a pair of opposing opposite side soil penetrating and separating seed dropping jaws, said jaws being elongated and extending generally along radii of said shaft outwardly of the outer ends of said tubular assemblies, each pair of jaws including confronting elongated recesses, the inner ends of the jaws of each assembly being pivotally supported from opposite sides of the corresponding tubular assembly for swinging about axes spaced outwardly of the remote sides of said jaws disposed generally normal to said shaft and for movement of the outer ends of said jaws toward and away from each other between closed positions with the recesses thereof defining an elongated cavity communicated at one end with the outer end of the corresponding tubular assembly and closed at its other outer end and open positions with the outer ends of said jaws spaced apart and the outer end of said cavity open, each pair of said jaws, when in the closed positions, defining an outwardly tapering wedge shaped ground penetrating implement and the outer ends of said jaws being shiftable toward and away from each other in directions generally paralleling the transverse direction in which said implement tapers, said jaws and a portion of said housing relative to which said shaft is rotatable including coacting means operative to force each pair of said jaws toward said open positions thereof as each pair of jaws is rotated about the axis of rotation of said shaft to preselected positions at least closely adjacent their lowermost positions relative to said axis, said coacting means including a radially outwardly projecting cam member carried by said portion of said housing relative to which said shaft is rotatable and a cam follower mounted on each of said tubular assemblies for limited reciprocation therealong, said cam followers being successively engageable with said cam member for outward displacement along said tubular assemblies toward said jaws, the inner ends of each pair of jaws including laterally projecting abutments closely adjacent a plane disposed generally normal to said shaft and containing the centerline of the corresponding cavity, each of said followers, upon being outwardly displaced by said cam member, being engageable with the corresponding abutments to outwardly displace the latter so as to cause the outer ends of the corresponding jaws to move apart.

References Cited

UNITED STATES PATENTS

| 200,415 | 2/1878 | Timmersmann | 111—91 |
| 1,042,617 | 10/1912 | Spaulding | 111—90 |
| 1,053,235 | 2/1913 | Sparks | 111—90 |
| 1,093,462 | 4/1914 | Norris | 111—90 |
| 2,503,828 | 4/1950 | Loucks | 111—89 |
| 3,103,186 | 9/1963 | Saifuku | 111—89 X |

FOREIGN PATENTS

| 415,733 | 7/1925 | Germany. |

ABRAHAM G. STONE, *Primary Examiner.*

A. E. KOPECKI, *Assistant Examiner.*